United States Patent [19]

Schipfer et al.

[11] Patent Number: 5,047,493
[45] Date of Patent: Sep. 10, 1991

[54] CATIONIC PAINT BINDERS BASED ON POLYETHER URETHANES AND PROCESS FOR PREPARATION THEREOF

[75] Inventors: Rudolf Schipfer; Wolfgang Daimer; Gerhard Schmölzer, all of Graz, Austria

[73] Assignee: Vianova Kunstharz, A.G., Werndorf, Austria

[21] Appl. No.: 546,934

[22] Filed: Jul. 2, 1990

Related U.S. Application Data

[62] Division of Ser. No. 266,561, Nov. 3, 1988, Pat. No. 4,939,226.

[30] Foreign Application Priority Data

Nov. 3, 1987 [AT] Austria ................................ 2882/87

[51] Int. Cl.$^5$ ...................... C08G 18/18; C08G 18/08; C08G 18/80
[52] U.S. Cl. ......................................... 528/45; 528/54; 528/61; 524/591; 524/839
[58] Field of Search ............................ 528/45, 54, 61; 524/591, 839

[56] References Cited

U.S. PATENT DOCUMENTS

| | | | |
|---|---|---|---|
| 3,883,483 | 5/1975 | Anderson et al. | 528/45 |
| 4,357,441 | 11/1982 | Hamamura et al. | 524/591 |
| 4,507,431 | 3/1985 | Stutz et al. | 524/840 |
| 4,581,388 | 4/1986 | Rasshofer et al. | 521/159 |
| 4,608,416 | 8/1986 | Schupp et al. | 525/130 |
| 4,623,709 | 11/1986 | Bauriedel | 528/65 |
| 4,778,845 | 10/1988 | Tschan et al. | 524/710 |
| 4,798,879 | 1/1989 | Hannah et al. | 528/45 |

OTHER PUBLICATIONS

Jouranl of Polymer Science: Polymer Letters Edition, vol. 23, pp. 509–515, 1985—Ono et al.

Primary Examiner—John Kight, III
Assistant Examiner—Dennis R. Daley
Attorney, Agent, or Firm—Breiner & Breiner

[57] ABSTRACT

Cationic paint binders based on polyether urethanes are formed by selective reaction of one NCO-group of a diisocyanate which contains NCO-groups of different reactivities with the primary hydroxyl groups of a polyhydroxypolyether in the presence of 1,4-diazabicyclo-2,2,2-octane (DABCO) as catalyst, and subsequently reacting the remaining NCO-group of the diisocyanate with the secondary amine. The binders which are largely free of low molecular basic by-products are used for formulating paints, particularly cathodically depositable electrodeposition paints, which are water-dilutable after protonation.

2 Claims, No Drawings

CATIONIC PAINT BINDERS BASED ON POLYETHER URETHANES AND PROCESS FOR PREPARATION THEREOF

This is a division of application Ser. No. 07/266,561, filed Nov. 3, 1988, now U.S. Pat. No. 4,939,226.

FIELD OF INVENTION

This invention relates to cationic paint binders based on polyether urethanes and to a process for the preparation of the binders. The binders of the invention are particularly suitable for the formulation of cathodically depositable coatings.

BACKGROUND OF INVENTION

Cationic polyether urethanes are obtained, for example, as described in German Patent No. 2,252,536, from epoxy resin/amine adducts by reaction with half-blocked diisocyanates. Austrian Patent No. 343,169 discloses the introduction of basic nitrogen groups into various base resins, e.g., epoxy resin esters, by reaction with basic monoisocyanates. The epoxy resins used in the processes of the aforesaid patents can also be modified by partial reaction with diphenols, (poly)glycols, diamines or dicarboxylic acids, with chain lengthening, as described in a number of references.

It is also known from the literature that a preferred reaction of one of the two NCO-groups of isophorone diisocyanate (IPDI) can be obtained by using various catalysts. Thus, Ono, Jones, and Pappas in *The Journal of Polymer Science,* Polymer Letters Edition, Volume 23, 509–515 (1985), describe how dibutyl tin dilaurate catalyzes the reaction of methanol or tert.-butanol essentially with the secondary NCO-group of IPDI. 1,4-diazabicyclo-2,2,2-octane (DABCO), as a catalyst, on the other hand shows a clear preference for the primary NCO-groups of IPDI.

SUMMARY OF INVENTION

It has now been found that cationic paint binders based on polyether urethanes can be prepared with a wide range of variation through a reaction sequence which is easy to monitor and which avoids the formation of undesirable low molecular by-products, if polyisocyanates having NCO-groups which possess different degrees of reactivity are selectively reacted at one end with the primary hydroxyl groups of a hydroxypolyether and the remaining NCO-groups are then reacted, at least to some extent, with a protonable amine compound.

The present invention, therefore, relates to a process for preparing cationic paint binders based on polyether urethanes characterized in that (A) the primary hydroxyl groups of a polyhydroxypolyether, which is optionally modified by chain lengthening and optionally contains ester groups, (B) are partially or wholly reacted with diisocyanate having NCO-groups which possess different reactivities, preferably in the presence of an inert solvent, using from 0.02 to 0.1 mole percent, based on the NCO-groups which are to be reacted, of 1,4-diazabicyclo-2,2,2-octane octane (DABCO) as catalyst, selectively at a temperature of from about 30 to 80° C, and then (C) reacting at a temperature of from about 20 to 80° C. the remaining NCO-groups of the polyisocyanate with primary and/or preferably secondary aliphatic amines and, optionally, (D) reacting, wholly or partially, the remaining primary and/or secondary hydroxyl groups with half-blocked (semi-blocked) isocyanates, with the proviso that the proportions of the reaction components are selected so that the end product has a basicity which ensures satisfactory water-dilutability of the binder after protonation.

The invention further relates to the cationic paint binders prepared by the process of this invention and to the use of the binders, optionally in combination with other resin components, as binders in water-dilutable paints, particularly for electrodeposition paints which can be cathodically deposited.

The method of this invention provides an essentially simpler way of introducing basic groups into urethane paint binders and does not lead to the formation of unwanted low molecular by-products. Low molecular, totally masked isocyanates, particularly if they carry basic groups, cause problems in cathodic paints since they affect the MEQ-stability, i.e., the constancy of the proportion of neutralizing agent in the precipitation bath. Moreover, the process according to the invention avoids the difficulties encountered in the preparation of basic monoisocyanates.

GENERAL DESCRIPTION OF INVENTION

The polyhydroxypolyethers used in the first step of the process of this invention have at least one and preferably at least two primary hydroxyl groups per molecule. As starting material for paint binders, they should have a molecular weight of at least about 200. Within the scope of this application, the term polyhydroxypolyethers also includes products which optionally contain ester groups in addition to hydroxyl and ether groups.

A preferred group of polyhydroxypolyethers for use according to this invention are reaction products of polyglycidyl compounds with alpha-omega-diprimary diols, optionally with the use of a proportion of monoalcohols. The reaction of these components is effected in known manner etherate The polyglycidyl comusing using catalysts such as $BF_3$ etherate. The polyglycidyl compounds used, which include the diglycidyl compounds, are preferably epoxy resins based on bisphenol A or bisphenol F. Of these compounds, epoxy resins with an epoxy equivalent weight of between 190 and 1000 are particularly preferred. Other polyglycidyl compounds are derived from glycols or polyglycols or phenol novolaks, these products advantageously being used in admixture with bisphenol epoxy resins. Glycidyl compounds which have been chain lengthened may also be used. The methods and materials for making such products are known to those skilled in the art. The chain lengthening can be accomplished, for example, using diols, diphenols, primary monoamines, and primary-tertiary diamines of dicarboxylic acids. The hydroxyl groups of the products can also be partially pre-reacted with partially blocked isocyanate compounds. Examples of the difunctional hydroxyl compounds used for reaction with the glycidyl compounds include alkylenediols such as ethyleneglycol and its homologues, and the corresponding di-, tri- or polyalkyleneglycols, hydrogenated diphenols, dialkyleneglycolethers of diphenols, or caprolactone diols. If desired, compounds with more than two hydroxyl groups may also be used provided that their actual hydroxyl functionality resulting from their reactivity or for steric reasons is not substantially above two. Examples of such compounds include glycerol and trimethylol propane. In addition to the difunctional alcohols, it is also possible to use a portion of monoalcohols such as alkanols with more than four carbon atoms or glycolmonoethers. Primary hydroxyl groups may also be introduced by the esterification of epoxy resins with hydroxycarboxylic acids containing primary hydroxyl groups, e.g., dimethylolpropionic acid. In the preparation of these polyhydroxyl polyethers, one mole of the difunctional hydroxyl compound is used per mole of oxirane groups present in the glycidyl compound, resulting in the desired polyethers with primary hydroxyl groups in the end position.

If desired, the polyhydroxypolyethers may be further modified by reacting some of the primary hydroxyl groups with monoglycidyl compounds in the presence of catalysts such as $BF_3$-etherate. Examples of the monoglycidyl compounds used include alkyl-glycidylethers such as 2-ethylhexylglycidylether or preferably the glycidylester of the so-called KOCH-acids, i.e., of tertiary alkanecarboxylic acids. As another possible method of modifying the polyhydroxypolyethers, it is possible to react the primary and secondary hydroxyl groups of the polyhydroxypolyethers with epsilon-caprolactone.

Another group of higher molecular polyhydroxypolyethers useful in practicing this invention includes the reaction products of alkoxylated phenols with isocyanate compounds, preferably diethylene or dipropyleneglycolethers of bisphenol A with polyisocyanates such as the diisocyanates.

In all the modifications it is essential that the components and proportions are selected so that the resulting preliminary polyhydroxypolyether product has on average at least one primary hydroxyl group per molecule. The selective reaction (B) of the primary hydroxyl groups of polyhydroxypolyethers with diisocyanates to obtain one free NCO-group is effected at 20 to 80° C in the presence of 0.02 to 0.1 mole percent of diazabicyclooctane, based on the NCO-groups which are to be reacted. Preferably, 0.04 to 0.08 mole percent of the catalyst is used.

The diisocyanates used according to this invention are products wherein the NCO-groups have different reactivities. Examples of such products are isophorone diisocyanate (IPDI) and 2,4-toluylenediisocyanate.

The polymers obtained after first reaction step (B) will still contain free NCO-groups. These free NCO-groups are reacted according to step (C) with NH- or OH-functional reactants which additionally have an N-basic grouping which is inert in the presence of isocyanate groups. The inert N-basic grouping is a tertiary alkylamine group and/or a primary amino group which is defunctionalized in the form of its ketimine. Suitable NH- or OH-functional reactants include, therefore, N,N-dimethylaminopropylamine, N,N-diethylaminopropylamine, N,N-dimethylethanolamine, hydroxyethylpiperazine, monoethanolamine-ketimines, aminoethylethanolamine-ketimines, and diethylenetriamine-ketimines. By the reaction of the NCO-group of the polymer with the NH- or OH-function, substituted urea or urethane bridges are formed and the N-basic grouping is introduced as a protonizable group into the polymer molecule, optionally after hydrolysis of the ketimine grouping. Any excess NCO-groups present which do not serve to introduce N-basic groupings may be reacted in known manner with long-chained monoamines, alcohols, hydroxyethyl(meth)acrylates, and the like. The proportions of reactants to be used in step (C) are selected in order that the reaction product has an amine number of about 20 to about 150 mg KOH/g, and the product has at least a basicity which will ensure satisfactory water-dilutability after protonation with 30 to 80 milliequivalents of formic acid or acetic acid per 100 g of solid resin. The number of protonable groups required will readily yield the proportions or numbers of groups essential to the reaction in each step of the process. Any basic groups introduced in one of the preliminary stages is to be taken into account.

The binders of this invention may be used in combination with crosslinking components such as blocked di- or polyisocyanates or polymer components containing such groupings. In order to obtain self-crosslinking binders, the hydroxyl groups present in the molecule after step (C) of the process may be wholly or partially reacted in step (D) with half-blocked diisocyanates in known manner.

After step (D), any ketimine groups present are converted into primary amino groups by the addition of water. After neutralization with organic carboxylic acids, the binders according to the invention may be used for the preparation of water-dilutable paints, particularly of cathodically depositable electrodeposition paints. The procedures used for the manufacture of paint and the additives which may be used are conventional except to the extent that they must be adapted to the particular application selected. Such adaptations are known to those skilled in the art.

PRESENTLY PREFERRED EMBODIMENTS

The following examples illustrate the invention without restricting its scope. Unless otherwise stated, all parts or percentages given relate to units by weight. The abbreviations used in the examples are as follows:

| | |
|---|---|
| EPH I | Diglycidylether of bisphenol A (EEW about 190) |
| EPH II | Diglycidylether of bisphenol A (EEW about 475) |
| EPH III | Polyglycidylether based on phenol novolak (EEW about 180) |
| CPL | Epsilon-caprolactone |
| TDI | Toluylene diisocyanate (standard commercial 80/20 isomer mixture) |
| IPDI | Isophorone diisocyanate |
| DGDME | Diethyleneglycoldimethylether |
| DABCO | 1,4-diazabicyclo-2,2,2-octane, used as a 1% solution in DGDME (the amounts given in the examples refer to this 1% solution) |
| MIBK | Methylisobutylketone |
| AEOLA-KET | Aminoethanolamine - MIBK - ketimine |
| DETAKET | Diethylenetriamine - MIBK - diketimine |
| DEAPA | N,N-diethylaminopropylamine |
| HEP | Hydroxyethylpiperazine |
| EEW | Epoxy equivalent weight |
| Viscosity GH | Viscosity according to Gardner-Holdt (g resin solution + g DGDME) |
| Solubility | Millimoles of HCOOH required per 100 g of solid resin |
| Val EPH | Equivalent epoxy resin (containing 1 epoxy group) |

(A) Preparation of the Polyhydroxypolyethers (AA) 399 g (2.1 Val) of EPH I, 1995 (4.2 Val) of EPH II, 292 g (2 mole) of adipic acid and 268 g (2 mole) of dimethylolpropionic acid are reacted in 80% solution in DGDME in the presence of 0.5 mole percent (based on the carboxyl groups) of triethylamine as catalyst at 120° C. up to an acid number of less than 3 mg KOH/g. The product has an epoxy content of substantially zero. The mixture is diluted with DGDME to give a solids content of 65%.

(AB) 798 g (4.2 Val) of EPH I, 997.5 g (2.1 Val) of EPH II are reacted with 404 g (2 mole) of sebacic acid and 268 g (2 mole) of dimethylolpropionic acid as specified in (AA). The mixture is then combined, within 2 hours, with 264 g (1 mole) of a TDI blocked at one end with ethyleneglycol monoethylether at 90° C and reacted to give an NCO-value of substantially zero. The mixture is diluted to 65% with DGDME.

(AC) 124 g of ethyleneglycol (2 mole) are heated with 31 g of DGDME and 0.4 g of BF3-etherate to 60° C and within 2 hours a solution of 1187.5 g (2 Val) of EPH II (80% in DGDME) is added, and the mixture is reacted until an epoxy content of substantially zero is achieved. The mixture is diluted with DGDME to a solids content of 65%.

(AD) To the 80% solution of polyhydroxypolyether prepared in paragraph (AC), 304 g (1 mole) of a TDI blocked at one end with 2-ethylhexanol are added at 90° C within 2 hours, and the mixture is reacted to give an NCO-value of substantially zero. The mixture is diluted with DGDME to a solids content of 65%.

(AE) To a 70% solution of 908.6 g (2 mole) of a standard commercial diethyleneglycolether of bisphenol A in DGDME, 174 g (1 mole) of TDI are added at 120° C within 2 hours, and the mixture is reacted to give an NCOvalue of substantially zero. The solids content is adjusted to 70% with DGDME.

(AF) An 80% solution of 760 g (4 Val) of EPH I, 440 g (2 mole) of nonylphenol and 228 g (1 mole) of bisphenol A in DGDME is heated to 150° C after the addition of 0.03 mole of diethanolamine per oxirane group, and the mixture is reacted until an epoxy value of substantially zero is obtained. The mixture is then combined at 120° C with 228 g (2 mole) of CPL and 0.02 g of tin octoate, and the mixture is reacted at 150° C for about 6 to 10 hours until the content of free CPL is less than 0.1% (determined by gas chromatography). The mixture is diluted with DGDME to a solids content of 80%.

(AG) In the same way as described in (AF), 540 g (3 Val) of EPH III, 440 g (2 mole) of nonylphenol and 114 g (0.5 mole) of bisphenol A are reacted in a 70% DGDME solution. After the addition of 342 g (3 mole) of CPL and 0.03 g of tin octoate, the mixture is reacted at 150° C. until there is a content of less than 0.1% of CPL. 146 g of DGDME are added to this solution at 80° C., and within 2 hours 304 g (1 mole) of TDI which is blocked at one end with 2-ethylhexanol are added and the mixture is reacted until an NCO-value of substantially zero is obtained. The solids content of the mixture is adjusted to 70% with DGDME.

EXAMPLE 1

4735 g of the 65% solution of the pre-product (AA) are mixed with 538 g of DGDME and 5.6 g of DABCO. At 30° C, 222 g (2 NCO-equivalent) of IPDI are added within 15 minutes, and the mixture is then reacted at 40° C until an NCO-value of 0.77% is obtained. After cooling to 30° C, the mixture is added within 30 minutes to a solution of 216 g (0.8 NH-equivalent) of DETAKET and 144 g of DGDME, which has been heated to 60° C, and the mixture is reacted until an NCO-value of zero is obtained. The product has the following characteristics:

| Solids Content | 60% |
| --- | --- |
| Viscosity GH (10 + 4) | M |
| Amine number | 25 mg KOH/g |
| Solubility | 30 mMole |
| pH value (15%) | 6.3 |

In order to prepare a self-crosslinking binder, 20 parts of TDI half-blocked with 2-ethylhexanol are added to 80 parts (solid resin) of the resin solution obtained above, at 60° C within 3 hours, and the mixture is reacted until an NCO-value of zero is obtained.

EXAMPLE 2

3796 g of the 65% solution of the pre-product (AB) are mixed with 459 g of DGDME and 5.5 g of DABCO. At 50° C, 222 g (1 mole) of IPDI are added within 30 minutes and reacted until an NCO-value of 0.97% is obtained. After being cooled to 30° C, the mixture is added to a solution of 216 g (0.8 NH-equivalent) of DETAKET and 144 g of DGDME, which has been heated to 60° C. The mixture is reacted at 60° C. until an NCO-content of zero is obtained and then kept at 80° C for a further 3 hours. The product has the following characteristics:

| Solids content | 60% |
| --- | --- |
| Viscosity GH (10 + 4) | N |
| Amine number | 30.8 mg KOH/g |
| Solubility | 35 mMole |
| pH value (15%) | 6.1 |

EXAMPLE 3

1652 g of the 65% solution of the pre-product (AC) are combined with 309 g of DGDME and 6.6 g of DABCO. At 40° C, 226.4 g (1.2 mole) of IPDI are added within 15 minutes and the mixture is reacted at 95° C until an NCO-content of 2.07% is obtained. The mixture is cooled to 40° C and then added within 30 minutes to a mixture of 186 g (1 NH-equivalent) of AEOLA-KET and 123 g of DGDME, which has been heated to 80° C. This mixture is then reacted at 60° C. until an NCOvalue of zero is obtained and maintained at 80° C. for a further 3 hours. The product has the following characteristics:

| Solids content | 60% |
| --- | --- |
| Viscosity GH (10 + 5) | L |
| Amine number | 37 mg KOH/g |
| Solubility | 49 mMole |
| pH value (15%) | 5.1 |

In order to prepare a self-crosslinking binder, 20 parts of a TDI half-blocked with 2-ethylhexanol are added at 60° C within 3 hours to 80 parts (solid resin) of the resin solution obtained above, and the resulting mixture is reacted until an NCO-value of zero is obtained.

EXAMPLE 4

2120 g of pre-product (AD) (70% solution in DGDME) are diluted with 319.5 g of DGDME and 5.5 g of DABCO are added. At 40° C, 222 g (1 mole) of IPDI are added within 30 minutes, and the mixture is reacted until an NCO-value of 1.41% is obtained. After cooling to 40° C, the mixture is added within 30 minutes to a mixture of 104 g (0.8 NH-equivalent) of HEP and 69 g of DGDME, which has been heated to 60° C., and the mixture is reacted at 60° C. until an NCO-value of zero is obtained and then kept for 3 hours at 80° C. The product has the following characteristics:

| Solids content | 60% |
|---|---|
| Viscosity GH (10 + 6) | I |
| Amine Number | 26 mg KOH/g |
| Solubility | 42 mMole |
| pH value (15%) | 5.2 |

In order to prepare a self-crosslinking binder, 20 parts of TDI half-blocked with 2-ethylhexanol are added to 80 parts (solid resin) of the resin solution obtained above at 60° C within 3 hours, and the mixture is reacted until an NCO-value of zero is obtained.

EXAMPLE 5

1151 g of pre-product (AE), (70% solution in DGDME), are diluted with 147 g of DGDME and, at 40° C., 2.4 g of DABCO are added. Then, within 30 minutes, 111 g (0.5 mole) of IPDI are added and the mixture is reacted at 65° C until an NCO-value of 1.49% is obtained. The mixture is immediately cooled to 30° C and added within 30 minutes to a solution of 108 g (0.4 NH-equivalent) of DETAKET and 189 g of DGDME, which has been heated to 60° C. The reaction is carried out at 60° C until an NCO-value of zero is obtained. The product has the following characteristics:

| Solids content | 60% |
|---|---|
| Viscosity GH (10 + 1) | R |
| Amine number | 44 mg KOH/g |
| Solubility | 60 mMole |
| pH value (15%) | 5.2 |

In order to prepare a self-crosslinking binder, parts of TDI half blocked with 2-ethylhexanol are added to 70 parts (solid resin) of the resin solution obtained above, at 60° C within 3 hours, and the mixture is reacted until an NCO-value of zero is obtained.

EXAMPLE 6

2070 g of pre-product (AF), as an 80% solution of DGDME, are diluted with 874 g of DGDME and 14 g of DABCO are added at 40° C. Within 30 minutes, 261 g (1.5 mole) of 2,4toluylene diisocyanate are added and the mixture is reacted at 40° C. until an NCO-value of 1.96% is obtained. The mixture is added within 30 minutes to a solution of 182 g (1.4 NH-equivalent) of DEAPA and 121 g of DGDME, which has been heated to 30° C. The resulting mixture is reacted, keeping the temperature below 30° C, until an NCO-value of zero is obtained. The mixture is then raised to and kept at 80° C. for a further 3 hours. The product has the following characteristics:

| Solids content | 60% |
|---|---|
| Viscosity GH (10 + 3) | P |
| Amine number | 35 mg KOH/g |
| Solubility | 61 mMole |
| pH value (15%) | 5.7 |

EXAMPLE 7

2485 g of pre-product (AG), as a 70% solution in DGDME, are diluted with 470 g of DGDME and 10 g DABCO are added at 40° C. Within 30 minutes, 261 g (1.5 mole) of 2,4-toluylene diisocyanate are added and the mixture is reacted at 40° C. until an NCO-value of 1.95% is obtained. The mixture is added within 30 minutes to a solution of 182 g (1.4 NH-equivalent) of DEAPA and 594 g of DGDME, which has been heated to 30° C. The resulting mixture is reacted, keeping the temperature below 30° C, until an NCO-value of zero is obtained. The mixture is then raised to and kept at 80° C. for a further 3 hours.

In order to prepare a self-crosslinking binder, 20 parts of TDI half blocked with 2-ethylhexanol are added to 80 parts (solid resin) of the resin solution obtained above at 60° C. within 3 hours. The mixture is reacted until an NCO-value of zero is obtained. The product has the following characteristics:

| Solids content | 60% |
|---|---|
| Viscosity GH (10 + 5) | R |
| Amine number | 28 mg KOH/g |
| Solubility | 45 mMole |
| pH value (15%) | 5.9 |

Testing Of The Binders According To The Invention

Paints were prepared from the binders according to Examples 1 to 7, corresponding to the formulation given hereinafter. The binders according to Examples 1, 3, 5 and 6 were used in their self-crosslinking modified form. The binders according to Examples 2, 4 and 7 were homogenized, at the ratio 70:30, 80:20 and 75:25, respectively, with a urethane crosslinker XX for 30 minutes at 60° C. The solids content of the binders was adjusted to 60% with DGDME in each case before processing.

Urethane Crosslinker XX

One mole of trimethylolpropane is reacted with 2.8 mole of TDI half-blocked with 2-ethylhexanol in a 70% solution of DGDME to provide urethane crosslinker XX.

| Paint Formulation |
|---|
| 100 parts of solid resin neutralized with the amount of formic acid listed in Table 1 |
| 36.5 parts of titanium dioxide |
| 20 parts of aluminium silicate pigment |
| 3 parts of lead silicate pigment |
| — dibutyl tin dilaurate as a catalyst in the quantities specified in Table 1 |

After the addition of the formic acid, the binders are ground with pigments as is conventional. After addition of the catalyst, the mixture is diluted with deionized water to give a solids content of 16% and the mixture is homogenized for 24 hours with stirring. The paint is applied by cathodic electrodeposition on degreased, cold-rolled sheet steel under conditions which produce a satisfactory film with a dry film thickness of $22\pm2$ microns.

The test results are set forth in Table 1 as follows:

TABLE 1

| B | Formic Acid mMole/ 100 g FH | Catalyst Parts/ 100 g FH | MEK Rub-Test (2) 160° C. (1) | Salt Spray Test (hours) ASTM B 117-64 (1) | | |
|---|---|---|---|---|---|---|
| | | | | 150° C. | 160° C. | 180° C. |
| 1 | 30 | 7.8 | 50 | 720 | 840 | over |

TABLE 1-continued

| B | Formic Acid mMole/ 100 g FH | Catalyst Parts/ 100 g FH | MEK Rub-Test (2) 160° C. (1) | Salt Spray Test (hours) ASTM B 117-64 (1) | | |
|---|---|---|---|---|---|---|
| | | | | 150° C. | 160° C. | 180° C. |
| 2 | 30 | 5.3 | 60 | 720 | 960 | 45 days over |
| 3 | 40 | 7.8 | 45 | 750 | 45 days over | 45 days over |
| 4 | 35 | 5.3 | 45 | 624 | 840 | 45 days over |
| 5 | 45 | 7.8 | 60 | 624 | 792 | 45 days over |
| 6 | 45 | 5.3 | more than 60 | 750 | 45 days over | 45 days over |
| 7 | 45 | 5.3 | more than 60 | 750 | 45 days over | 45 days over |

FH: Solid Resin
(1) Stoving temperature used for a period of 30 minutes.
(2) MEK Rub-Test: A cotton wool ball soaked in methylethylketone is passed over the paint film under a load of 1 kp. Table 1 shows, in "double strokes," the time at which it is possible to damage the paint with a fingernail.

As will be apparent too one skilled in the art, various modifications can be made within the scope of the aforesaid description. Such modifications being within the ability of one skilled in the art form a part of the present invention and are embraced by the appended claims.

It is claimed:

1. Process for preparing cationic paint binders comprising the steps of (1) providing a polyhydroxyplyether containing primary hydroxyl groups; (2) reacting said polyhydroxypolyether with a diisocyanate having NCO-groups with different reactivities, said reaction being carried out at a temperature of from about 30 to 80° C. to selectively react said primary hydroxyl groups with one of the NCO-groups of said diisocyanate in the presence of 0.02 to 0.1 mole percent of 1,4-diazabicyclo-2,2,2-octane as catalyst; (3) reacting at a temperature of 20 to 80° C. the remaining NCO-group of said diisocyanate with primary or secondary aliphatic amines; and (4) reacting the primary and secondary hydroxyl groups present on the reaction product of (3) at least partially with a half-blocked diisocyannate, the components and proportions thereof being controlled so that a binder prooduced by the process will have a basicity which will permit said binder to be diluted with water after protonation.

2. Cationic paint binders comprising the reaction product of (1) a polyhydroxypolyetherr containing primary hydroxyl groups, and (2) a diisocyanate having NCO-groups having different reactivities; said reaction for preparing said reaction product being carried out at a temperature of from about 30 to 80° C. and in the presence of 0.02 to 0.1 mole percent of 1,4-diazabicyclo-2,2,2-octane as catalyst to selectively react said primary hydroxyl groups of said polyhydroxypolyether with one of the NCO-groups of said diisocyanate; (3) subsequently reacting at a temperature of 20 to 80° C. the remaining NCO-group of said diisocyanate with primary or secondary aliphatic amines; and (4) reacting the primary and/or secondary hydroxyl groups present on the reaction product of (3) at least partially with a half-blocked diisocyanate, the components and proportions thereof being controlled so said binder being produced will have a basicity which will permit said binder to be diluted with water after protonation.

* * * * *